(12) United States Patent
Wang

(10) Patent No.: US 8,428,900 B2
(45) Date of Patent: Apr. 23, 2013

(54) UNIVERSAL QUALITY ASSURANCE AUTOMATION FRAMEWORK

(76) Inventor: Linsong Wang, SanJose, CA (US)

( * ) Notice: Subject to any disclaimer, the term of this patent is extended or adjusted under 35 U.S.C. 154(b) by 323 days.

(21) Appl. No.: 12/884,165

(22) Filed: Sep. 16, 2010

(65) Prior Publication Data

US 2012/0072159 A1 Mar. 22, 2012

(51) Int. Cl.
*G06F 15/00* (2006.01)
(52) U.S. Cl.
USPC .......................................................... 702/123
(58) Field of Classification Search .................. 702/123, 702/117, 118, 182–185
See application file for complete search history.

(56) References Cited

U.S. PATENT DOCUMENTS 7,003,560 B1 * 2/2006 Mullen et al. ................. 709/223

* cited by examiner

*Primary Examiner* — Edward Raymond
(74) *Attorney, Agent, or Firm* — Geeta Kadambi; Riddhi IP LLC

(57) ABSTRACT

The present invention provides a method and a system for a universal software quality assurance automation framework. The three reusable components of this framework are composed of a test resource comprising of a test module-entity driver-entity communication. The test module provides an opportunity to create several case scenarios and test logics. The entity driver enables the test environment software entities to be accessible to the test module, without prior knowledge of where those entities are located. The entity communication enables the drivers to communicate with various entities inside the test environment. The combination of the three reusable components enable the framework to be product agnostic. Multiple tests may be performed in parallel. Test cases are presented in the integrated graphical user interface as a hierarchical managing structure. The framework is collaborative and multiple users may use it simultaneously.

20 Claims, 12 Drawing Sheets

UNIVERSAL QUALITY ASSURANCE AUTOMATION FRAMEWORK

FIELD OF TECHNOLOGY

This disclosure relates generally to software testing and more particularly to provide a universal framework for software quality assurance testing automation.

BACKGROUND

Software quality assurance (QA) testing is performed to evaluate an attribute or capability of a program or system and determining that it meets its required results. Software quality assurance testing has lot of challenges both in manual as well as in automation. Although crucial to software quality and widely deployed by quality assurance engineers, software quality assurance testing still remains an art, due to limited availability of single piece of framework that would be product and operating system agnostic. Software testing may be a trade-off between budget, time and quality.

Software quality assurance testing for different products and platforms is done using disparate tools and custom built modules. This creates an undue burden on the quality assurance engineer and is difficult for the quality assurance engineer to go back and evaluate the testing code. Each quality assurance engineer has their own method of coding test scripts which creates a deficit of uniform test code monitoring system.

There is currently no defined process to start software quality assurance test automation. Quality assurance engineers tend to mix the test case logic and the product functionality together, create a monolithic piece of application, which makes readability, understanding and reuse of existing code very difficult.

SUMMARY

Embodiments of the present invention address deficiencies of the art in respect to quality assurance testing framework for software. An embodiment may provide a novel and non-obvious method and system for reusable software for a universal quality assurance automation framework.

In one embodiment, the test module provides an opportunity for the quality assurance engineer to implement test logic for various test cases. The code generated in another embodiment is transparently communicated to the entities in the test environment.

In one embodiment, the entity driver exposes the functionality of the product under test, and other entities in the test environment, to the test module. In another embodiment, the connection between the entity driver and underlying entity is facilitated by the entity communication module.

In one embodiment, the quality assurance automation framework provides integrated graphical user interface to define the test resource and generate template source code.

In one embodiment, the quality assurance automation framework provides a hierarchical authoring tool. In another embodiment, the quality assurance framework provides a management interface, comprehensive test report and activity logging system.

In one embodiment, the quality assurance automation framework is supported by a database to store, retrieve and present the entire framework activities. In another embodiment, the test infrastructure is extensible and easy to maintain.

In one embodiment, the quality assurance automation framework comprises of sequential and parallel test case execution engines. In another embodiment, the present quality assurance framework client side does not require any end-user configuration to start with. The ease of authoring and execution enable the quality assurance engineer to focus on product specific functionalities and test logic.

In one embodiment the quality assurance framework may be product and operating system agnostic. In another embodiment, the test resource code is accessible as a shared library and may be reused by quality assurance engineers.

The methods and systems disclosed herein may be implemented in any means for achieving various aspects, and may be executed in a form of a machine-readable medium embodying a set of instructions. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Several methods and systems for quality assurance testing of the software using test modules, entity driver and entity communication as test resources are disclosed. Although the present embodiments have been described with reference to specific example embodiments, it will be evident that various modifications and changes may be made to these embodiments without departing from the broader spirit and scope of the various embodiments.

Figure 1:
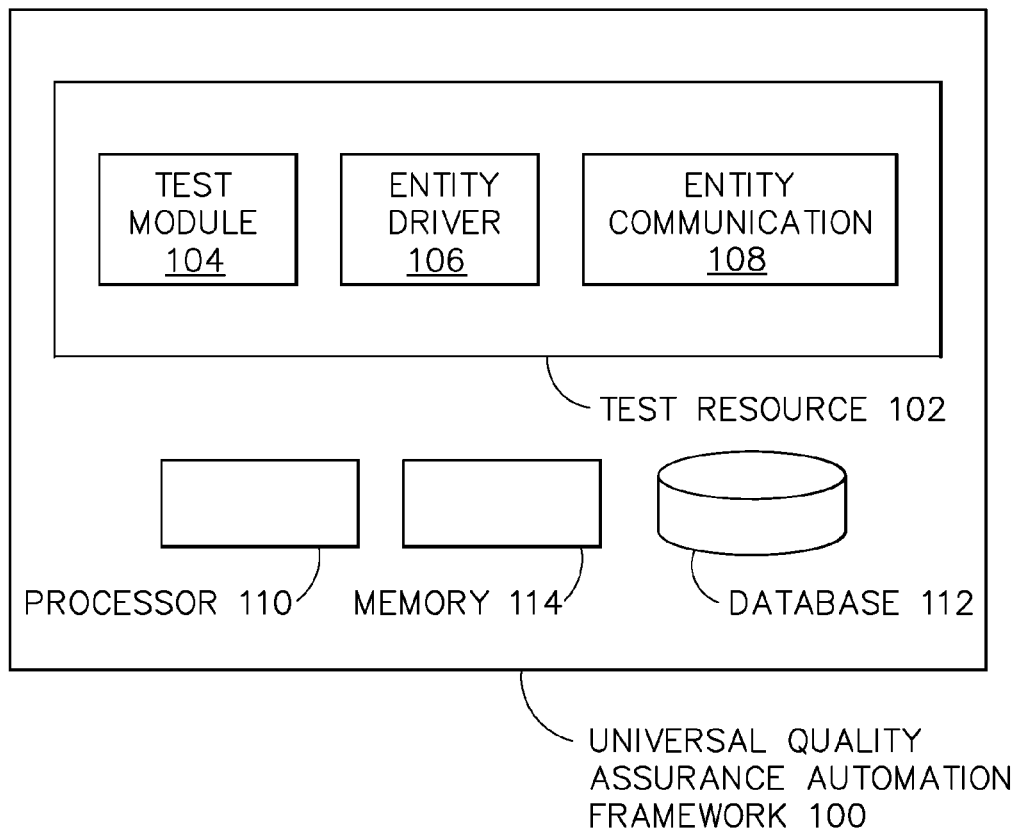
FIG. 1 is a diagrammatic illustration of the universal quality assurance automation framework 100.

FIG. 1 is a diagrammatic illustration of the universal quality assurance automation framework 100. The universal quality assurance automation framework 100 comprises of a test resource 102. The test resource 102 comprises of three parts, test module 104, entity driver 106 and entity communication 108. The test module 104 comprises of various test scenarios for individual test cases. The test module 104 enables the user (e.g., quality assurance engineer, manager, enterprise data management team personal etc.) to create a test case and save the test case in the universal quality assurance automation framework 100. The entity driver 106 enables a test module to access functionality of the quality assurance software and any other software that being tested with, and seamlessly executes the task. The entity communication 108 is the enabling link between the entity driver 106 and the quality assurance software being tested and the entity software used for testing. The entity software could be any established software such as Turbo Tax®, any web application such as Google® Gmail application, etc.

The three components of the testing software, test module 104, entity driver 106, and entity communication 108, together with the management system, are executed using a hardware having a processor 110, a memory 114 connected to a database 112. The universal quality assurance automation framework 100 may be employed for quality assurance testing software tools, which execute tests without manual intervention. This may also be applied in functional, system, performance, API, etc. testing. The universal quality assurance automation framework 100 may be invoked directly through user interaction, or accessed through the use of computer programs and/or scripts. Universal quality assurance automation framework 100 is suitable for use both by developers for unit tests and quality assurance for functional, system, and other testing of any software.

Figure 1A:
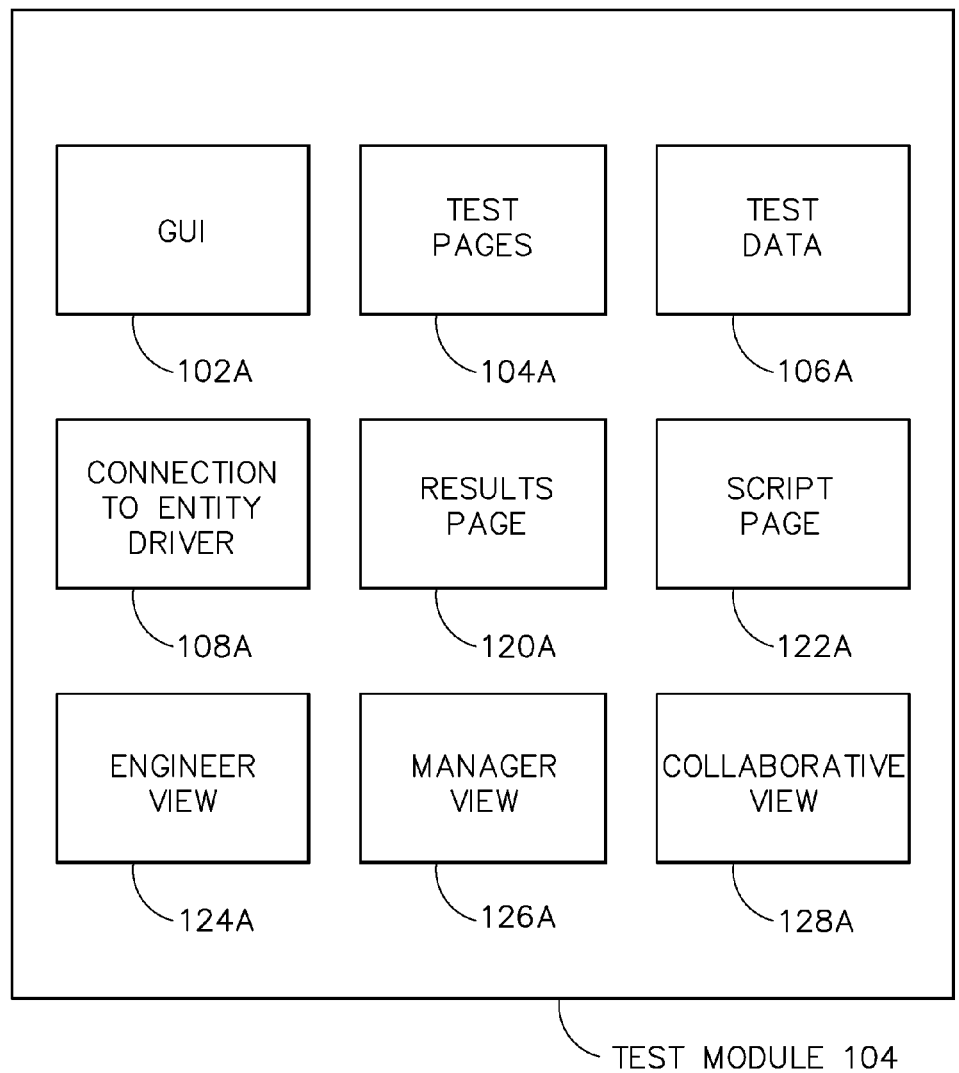
FIG. 1A is an expanded view of test module 104.

The test module 104 in FIG. 1A comprises of an integrated graphical user interface (GUI) 102A that allows the user to input test data 106A, test execution logic, create and view test page. The GUI also provides a transparent connection to the entity driver 108A. The results page A may be viewed by the user after running a software test using the universal quality assurance automation framework 100. The script page 122A enables the user to input test execution logic for a series of given test scenarios being tested for quality assurance testing. These script pages 122A can be reused, edited and quality assurance testing for the software can be done. Various users such as a quality assurance engineer might have a different view such as an engineer view 124A that may be different from that of a manager view 126A. The engineer view may allow the quality assurance engineer to enter test execution logic and new test cases, whereas the manager view 126A may be viewed by the manager and may not have write functions. The manager may for example have results view function and write comments for the quality engineer to review.

The universal quality assurance automation framework 100 may be used by a single user or multiple users in a collaborative view 128A. Multiple users may be able to use the same universal quality assurance automation framework 100 throughout the company and may be collaboratively use scripts for reuse, modify existing scripts for improving or changing the test execution logic.

Figure 1B:
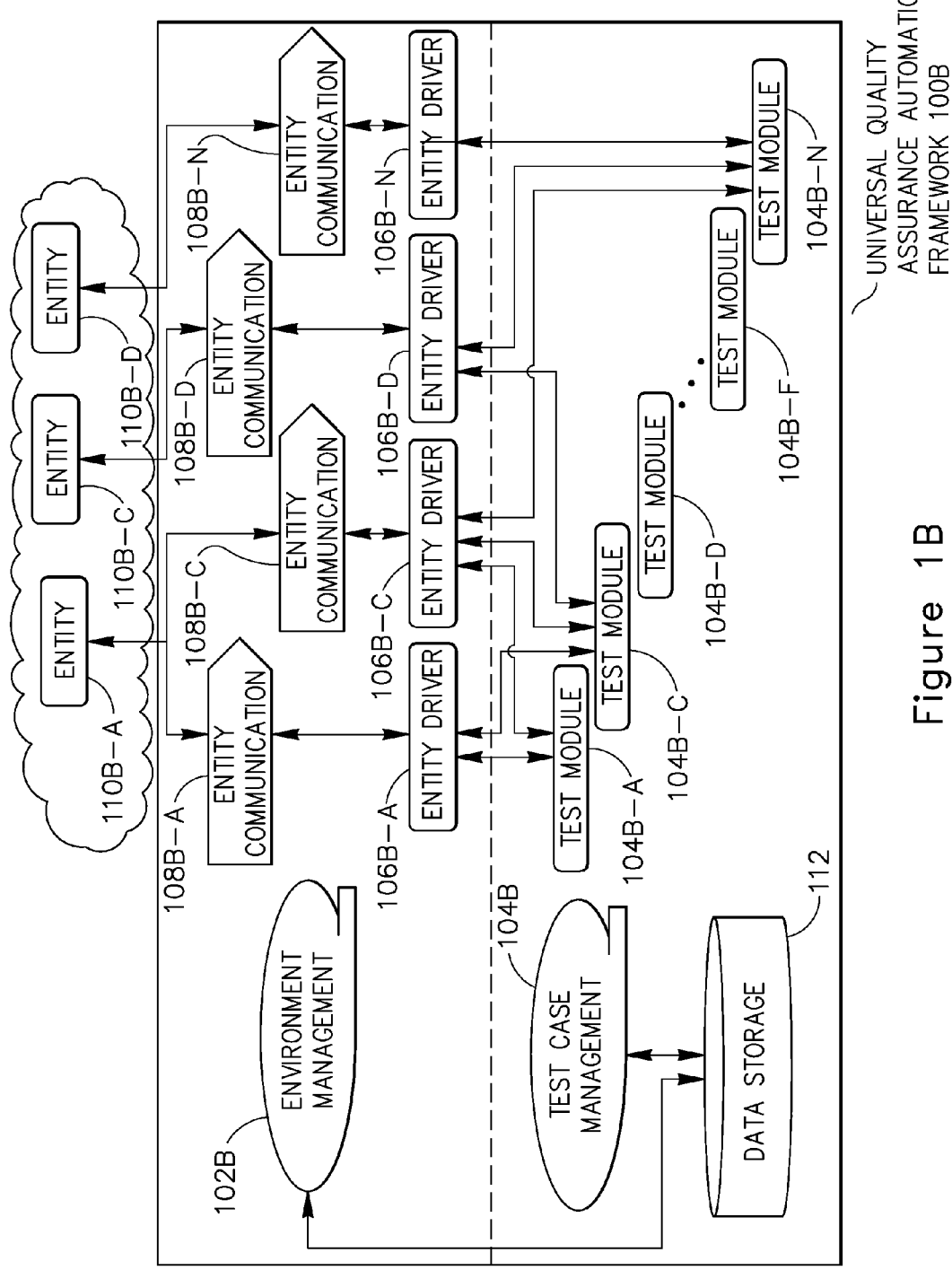
FIG. 1B is another view of automation framework 300.

FIG. 1B shows a process flow for the universal quality assurance automation framework 100 (framework 100B). Multiple entities are test subjects and are located outside the framework 100B and are connected to the test resource 102 via the framework 100B. The framework 100 may have an environment management 102B component that comprises of an entity communication 108. Several entity communications may be present as shown in FIG. 1B as 108B to 108B-N. The entity communication 108 may communicate with entity drivers 106 on one end and communicate and open up the functionality of several entities 110B to 110B-N on one end to facilitate the quality assurance testing. Several entity drivers are shown as 106B to 106B-N. The test modules listed as 104B-A to 104B-N may reference to single entity driver 106 or multiple drivers at the same time during quality assurance testing. The test case management 104B may be enabled by integrated graphical user interface 102A (IGUI). The entity driver 106B-A to 106B-N, collectively test case management 104B and environment management 102B may also communicate with the database 112 to access information and parameters for the quality assurance test. The test case management may be managed by IGUI comprises of several test modules (104) in one embodiment. These test modules 104 are managed with entity driver 106 and entity communication 108 for testing using outside resources such as entity 110. The data produced by the quality assurance test, used by the test resources such as environment management 102B and test case management 104B, is stored into and retrieved from the database 112.

In another embodiment, the entity driver's function may be translated by the entity communication 108 to drive to the entity (110B, 104B-C, 110B-N). The entity 110B-A-N may be classified in two categories such as entity-under-test and/or entity-for-test. They may be treated functionally separate and may comprise of but not limited to a website (UI or API), a web service provider, a GUI software application, a firmware image, a piece of test equipment, data generator and a power switch.

Figure 2:
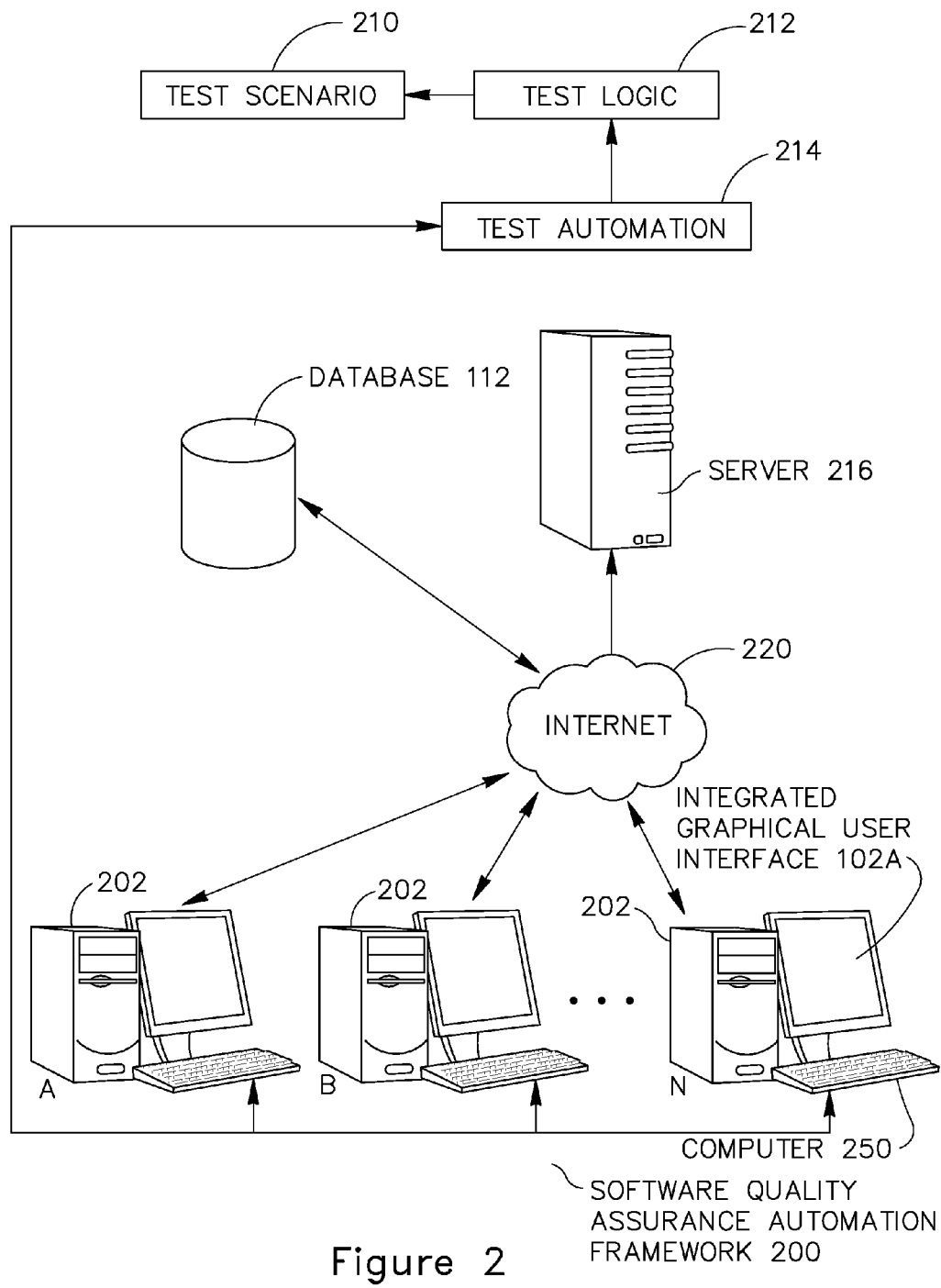
FIG. 2 is a network view of the software QA automation 200 in a network environment for performing the test.

FIG. 2 is a network view of the software quality assurance automation 200 for performing the test. The test scenario 210, test logic 212 and test automation 214 as a part of display on the GUI as a test module may reside on a server 216, and execute on client computers 202 (A, B, N . . . ) using an internet 220. A database 112 may also be connected to the computers and/or the server using the internet 220. The connection may be WAN and/or LAN.

Figure 3:
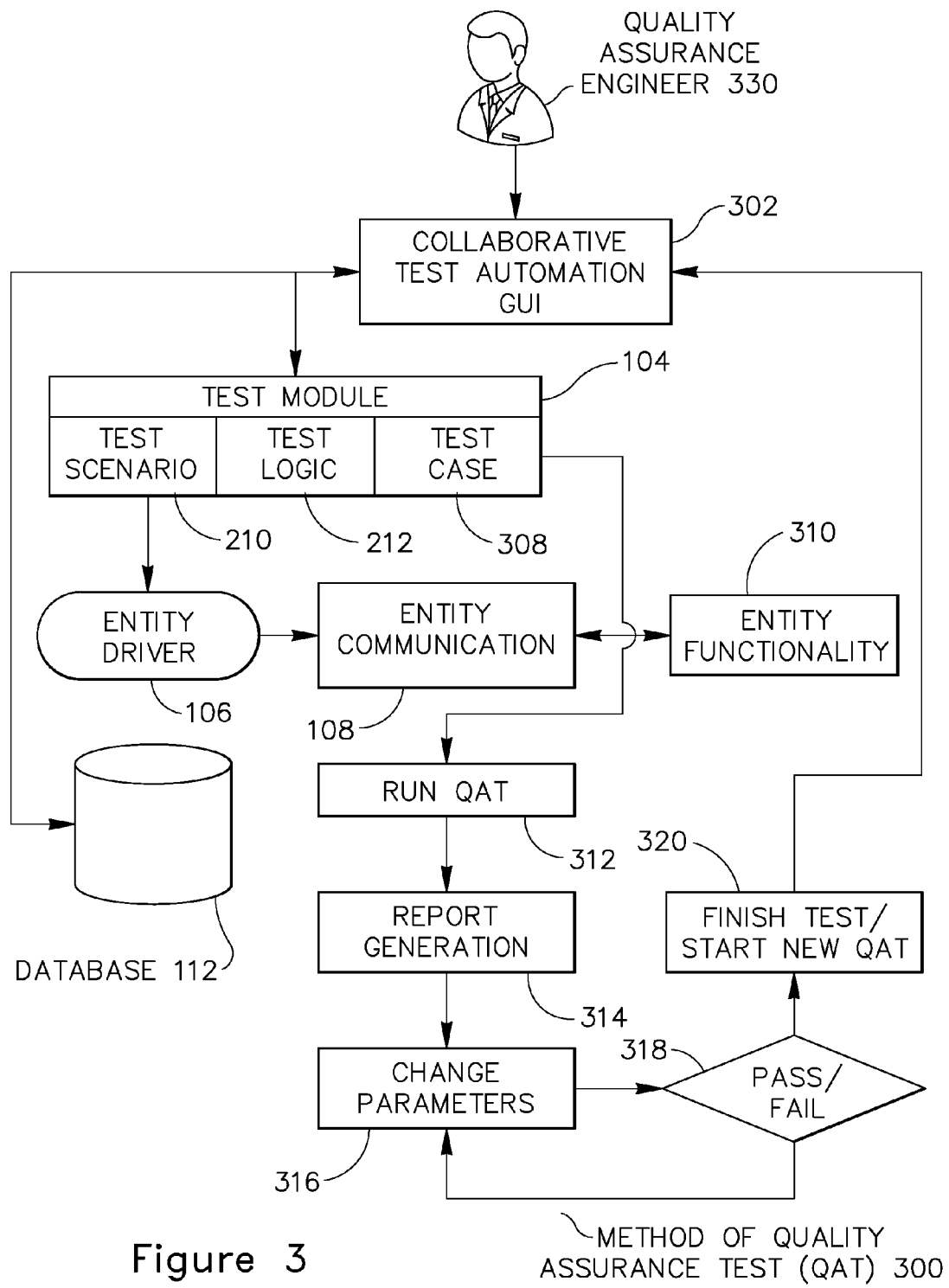
FIG. 3 is a process flow view of the method for quality assurance test (QAT) 300.

In one embodiment, FIG. 3 is a view of the method for quality assurance test (QAT) 300. The quality assurance engineer (QAE) 330 uses the collaborative test automation GUI or individual GUI and uses the test module 104 to create a quality assurance software test scenario. The user QAE 330 creates a test scenario based on the need for the type of quality assurance test that needs to be performed. In FIG. 3, the use of software to control the execution of tests using the run QAT 312, the comparison of actual outcomes to predicted outcomes using data from database 112, the setting up of test preconditions in the test module 104, and other test control and test reporting functions in the report generation 314 is done. Once the quality assurance test is performed, after observing the report generation 314 step the user can change parameters 316 if the results are not optimal such as fail or if pass 318 then the test concludes at step 320 and the user can start the new test all over again. The execution of test module 104, together with entity driver 106, is facilitated by entity communication 108 to expose the entity functionality 310 to be used for test logic and for testing. The test results may be stored in the database 112 for future retrievals and audit.

In one embodiment, a quality assurance engineer may create a quality assurance test case 308 for checking the functionality of a mail service, for example Gmail®, Yahoo Mail® or Hotmail® using the universal quality assurance automation framework 100. The quality assurance engineer may create a set of test scenario 210, such as invoking the correct browser, checking for logging in function, entering the user name and password, sending text and/or email, receiving the text and/or email, opening the email, opening the attachment, deleting the email, storing the email, composing an email, and logging out of account. Using the GUI 302, the QAE 330 would write the test logic 212 against entity driver 106. Once the whole steps of process are saved, the automation framework runs the quality assurance test (QAT) and stores the information in the database. The entity communication 108 further facilitates the entity driver 106 to get access to entity functionality 310, such as an URL access in this example and all the fields required by the mail server to be filed in before all the functions of that particular software may be tested for quality assurance. The run QAT 312 in the invention is novel because test module 104 runs against the entity driver 106 without the need to know where the entity 310 is actually located. The implementation of entity driver 106 and entity communication 108 may be independent to test module 104.

The universal quality assurance automation framework 100 is product agnostic and the is capable of accessing any product from the test station computer using protocols such as http, soap, telnet, ssh, sql, snmp, serial, gpib etc. It is not limited to the stated examples. The universal quality assurance automation framework 100 is also platform agnostic and may be used using any test station operating system and/or test development programming language.

Report data is generated throughout the run of QAT 312 function, and stored in the database 112. The test may have met the criteria set by the quality assurance engineer and it may state as pass in the report. If the criteria is not met or some other parameter may need to be added for testing then the change of parameter at step 316 may be performed and pass/fail 318 results may be obtained. The test may be finished at step 320 or another new test may be started at 320.

Figure 4:
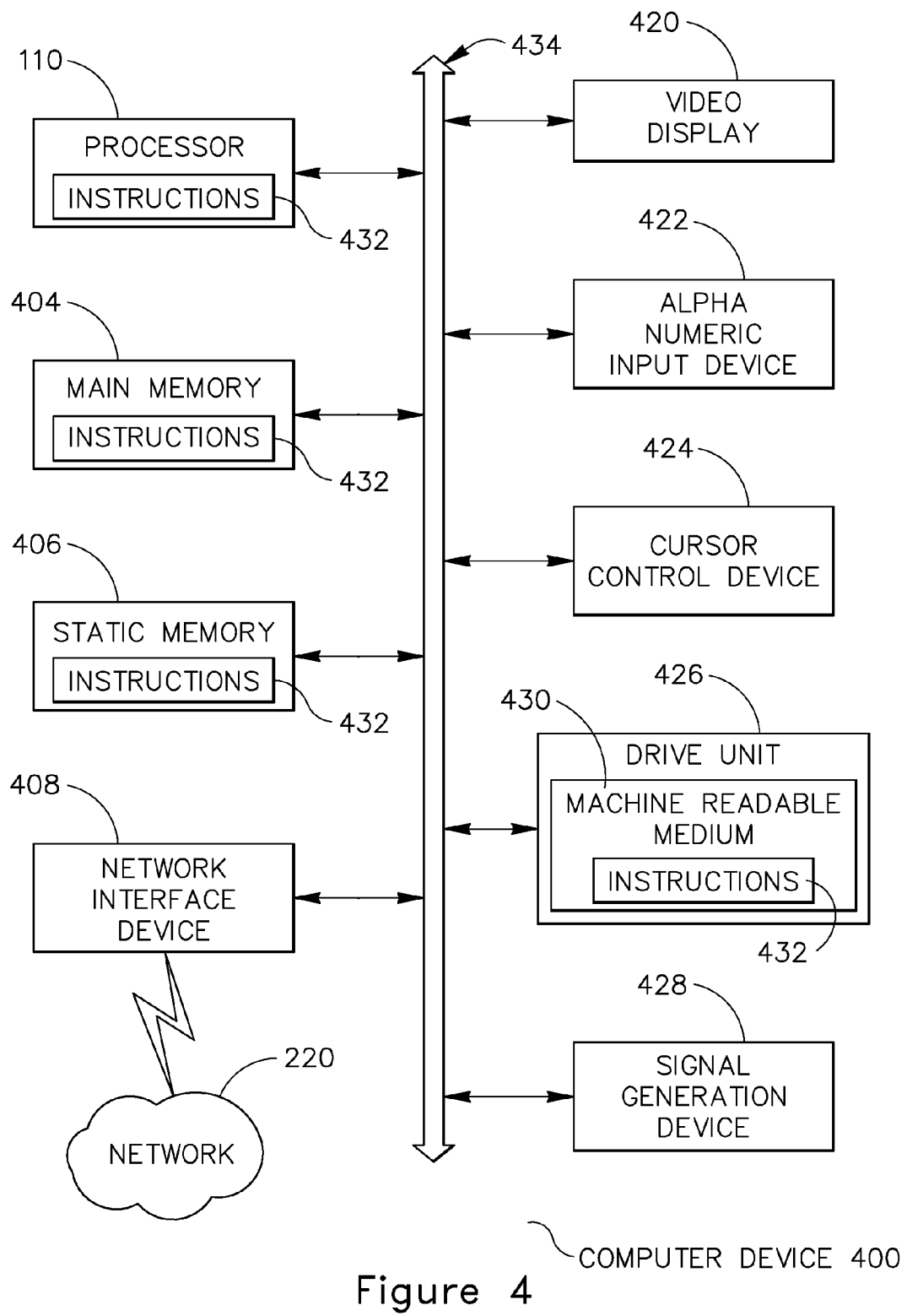
FIG. 4 is an exploded view of the computer device 600 and its various components being used for quality assurance testing.

FIG. 4 is an exploded view of the computer device 400 and its various components being used for quality assurance testing. FIG. 4 is a diagrammatic representation of a data processing system of the universal quality assurance automation framework 100 of FIG. 1 capable of processing a set of instructions to perform one or more of methodologies described herein, according to one embodiment. In various embodiments, the data processing system operates as a standalone device and for may be connected (e.g., networked through the network 220) to other machines. In a network deployment, the data processing system may operate as a workstation (e.g., to provide a graphic user interface) which connects to the universal quality assurance automation framework 100 of FIG. 1 directly and/or via the network 220. The data processing system may be any one or any collection of a personal computer (PC), a tablet PC, a set-top box (STB), a web appliance, a network router, a switch and/or a bridge, an embedded system, and/or any machine capable of executing a set of instructions (sequential and/or otherwise) that specify actions to be taken by the machine.

One example of the data processing system may include a processor 112 (e.g., a central processing unit (CPU) or the CPU and a graphics processing unit (GPU)), a main memory 404, and a static memory 406, which communicate to each other via a bus 434. The data processing system may further include a video display unit 420 (e.g., a liquid crystal display (LCD) and/or a cathode ray tube (CRT)), an alpha-numeric input device 422 (e.g., a keyboard), a cursor control device 424 (e.g., a mouse), a drive unit 426, a signal generation device 428 (e.g., a speaker), and a network interface device 408.

The drive unit 426 may include a machine-readable medium 430 on which is stored one or more sets of instructions (e.g., instruction 432) embodying any one or more of the methodologies and/or functions described herein. The instruction 432 may also reside, completely and/or at least partially, within the main memory 404 and/or within the processor 402 during the execution thereof by the data processing system, wherein the main memory 404 and the processor 402 may also constitute machine-readable media.

The instruction 432 may further be transmitted and/or received over the network 110 via the network interface device 408. While the machine-readable medium 430 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media, and carrier wave signals.

Figure 5:
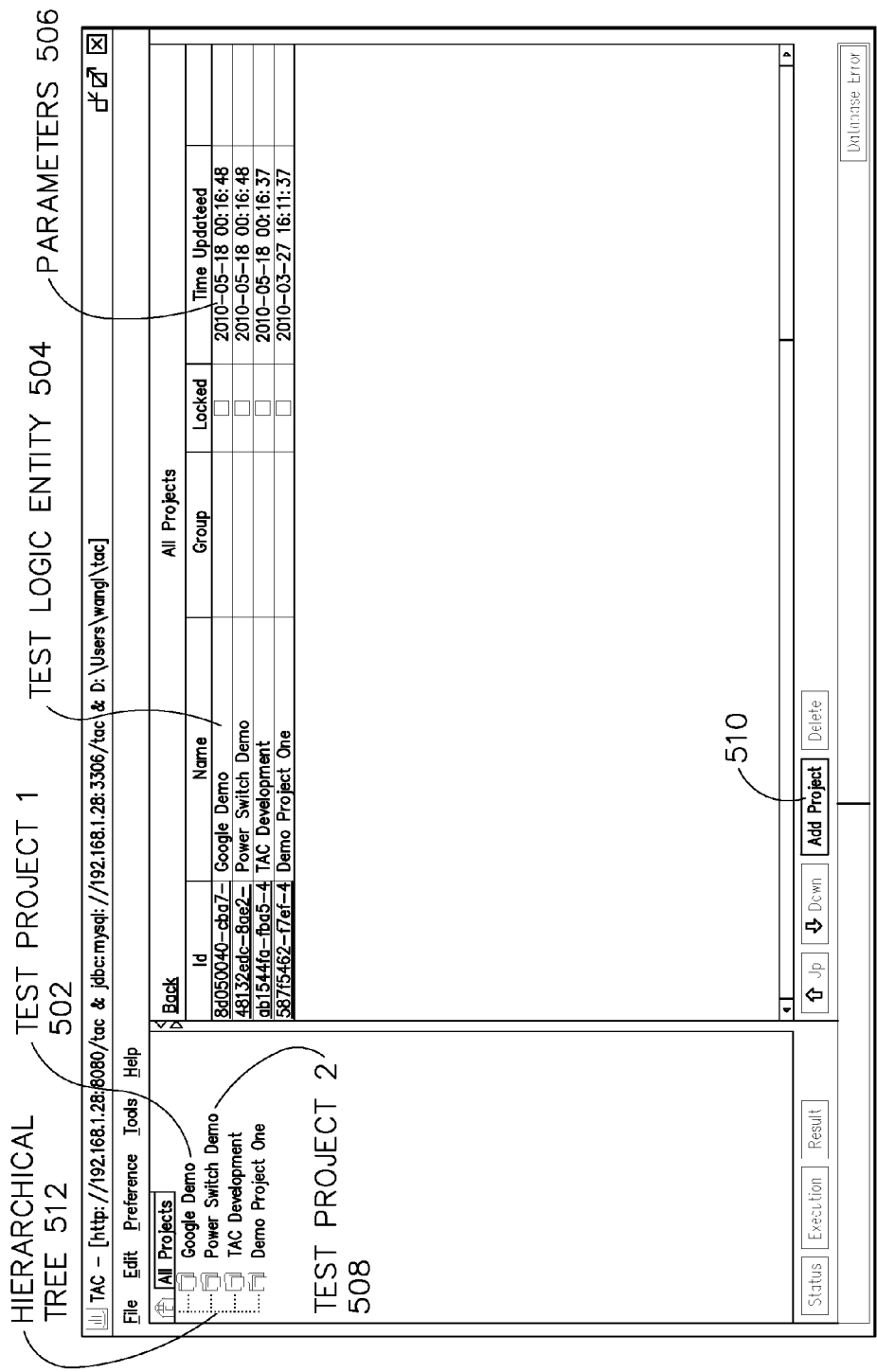
FIG. 5 is a view of the integrated graphical user interface (IGUI) 102A.

FIG. 5 is a view of the integrated graphical user interface (IGUI) 102A. IGUI 102A is the tool for quality assurance engineer to view and have a collaborative environment to create and execute the test cases for test module 104. In FIG. 5, an example of the IGUI is shown as a split panel. The left side panel shows a hierarchical tree 512 for various test cases organized in test project and test script, such as 502 and 508 in one view. The collaborative view enables the quality assurance engineer to reuse the existing test resource and modify the test execution logic 212 for further use. The right panel is the authoring interface for various levels of details, and execution interface a test script. The detailed time stamp, for example, is one of the properties that may be stored in the database 112 for future reference for the manager view 126A, collaborative view 128A or engineer view 124A. A new project can be added to the hierarchical tree by clicking on Add project 510 button.

Figure 6:
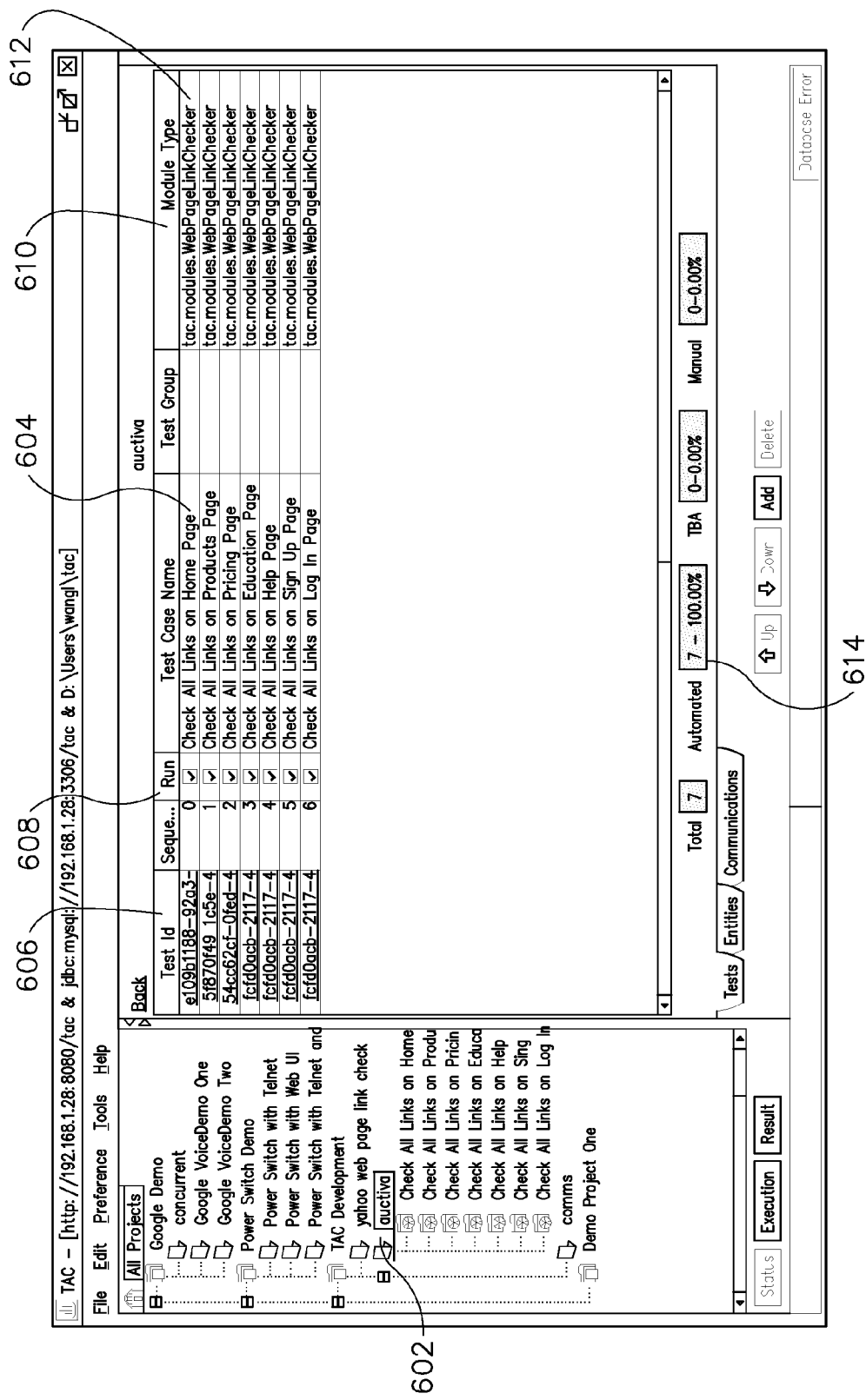
FIG. 6 is another view of the IGUI 102A showing hierarchical view of test case management.

FIG. 6 is another view of the IGUI 102A showing further details of the hierarchical view of a test case scenario. A test script such as 602 shows the various scripts created and stored for testing in a hierarchical tree format on the left panel. Correspondingly, on the right panel in the IGUI 102A the sequence of the test case 602 are displayed. Test Id 606 may show machine generated unique Id for a particular test case. Run 608 column shows the status of the test case such as run or not run as a check box. In another embodiment a separate column test case name shows for example shows "Check all links on home page" 604 for the test case scenario. The module type 610 is displayed for the Test Id 606 and test case name 604 as object 612. Test Automated 614 shows the implementation status of the test script, such as automated 100%. The percentage of automation is the statistics of current quality assurance progress.

Figure 7:
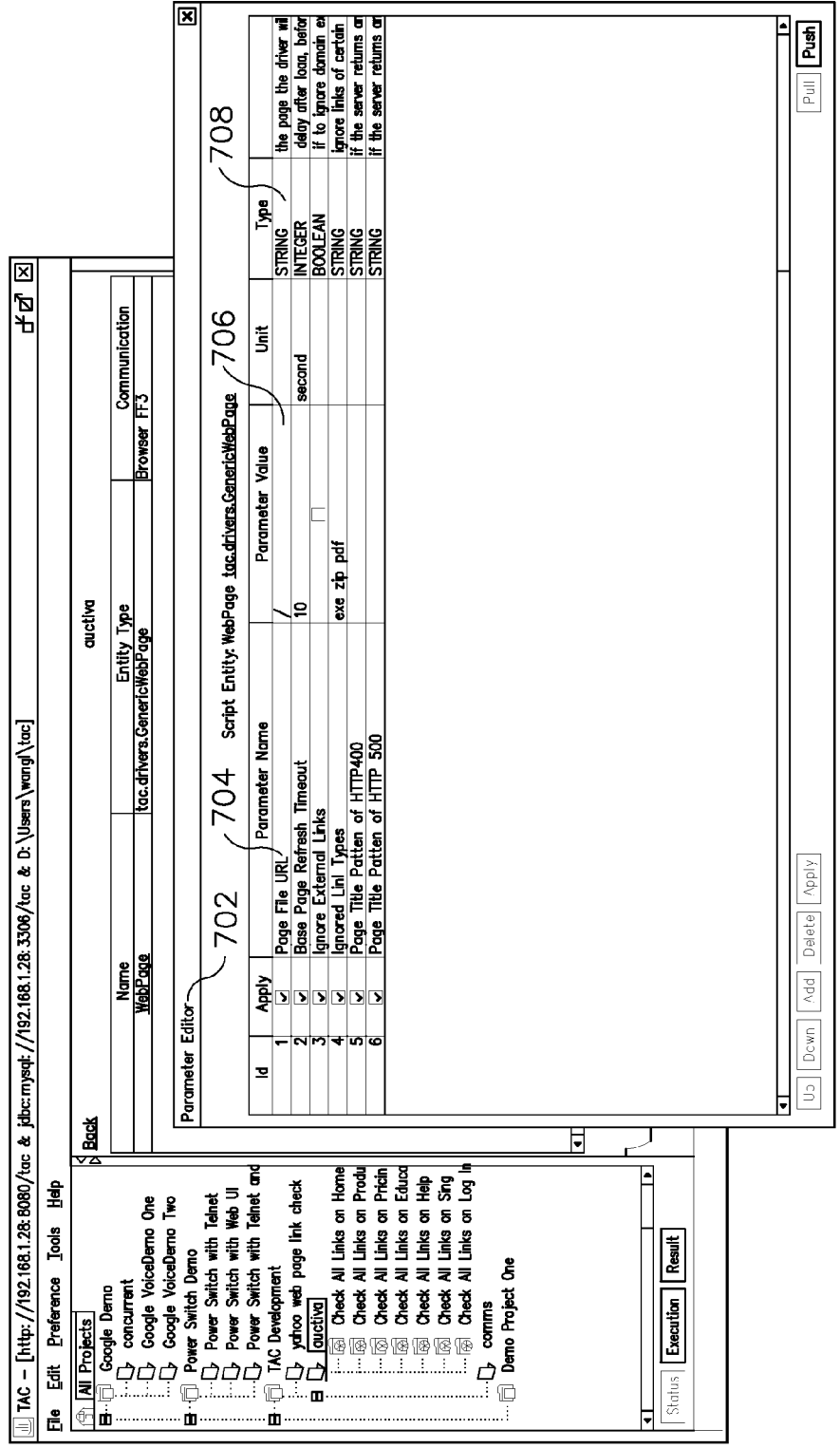
FIG. 7 is another illustration of the IGUI 102A showing various test resource parameters.

FIG. 7 is another illustration of the IGUI 102A showing various entity driver parameters. Parameter editor 702 in FIG. 3 allows the user to change parameter 316 step is shown in more detail for specific entity driver in FIG. 7. Parameter name 704, parameter value 706 and type 708 are shown as one embodiment. The quality assurance engineer may use this information for evaluating the test result and may decide to change in one embodiment, in one another embodiment the user may decide to observe the results and reuse the test parameter for some other test scenario. The manager view may enable the supervisor of the quality assurance manager, for example review the parameters and decide appropriateness of the test parameters and approve or disapprove the test case.

Figure 8:
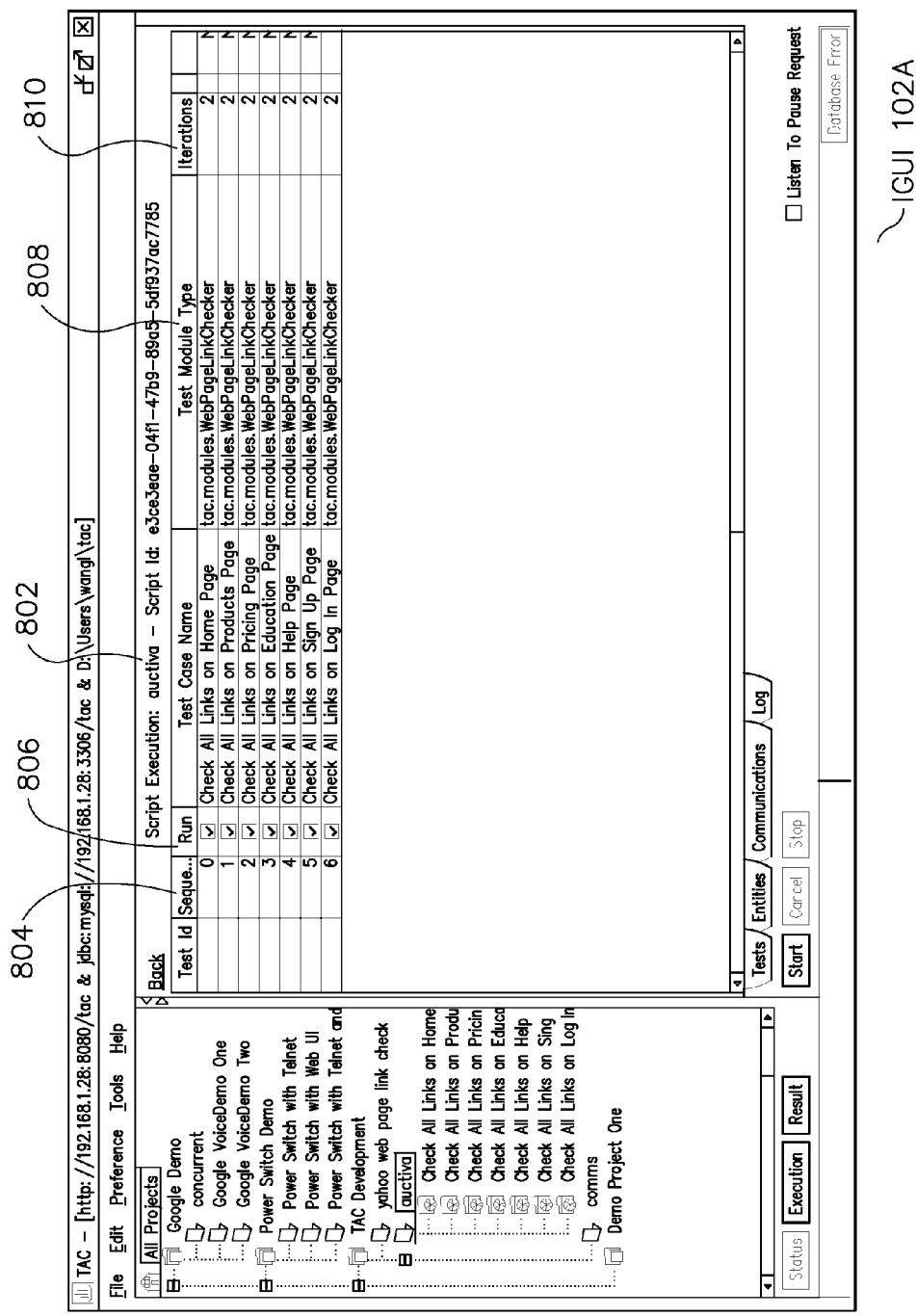
FIG. 8 is a view of IGUI 102A showing one test module of test logic for various test scenarios.

FIG. 8 is a view of IGUI 102A showing various steps for test execution logic of a list of test scenarios. This script execution interface has additional columns to control the execution logic. The Iterations column is to show how many iterations the test case runs to pass and/or fail the quality assurance software test. This may be useful to monitor the failures and success of the particular test logic for a test scenario. The script execution IGUI page 802 enables the user to see the sequence of test cases being executed. For a particular script, the sequence of test cases can be listed and seen in column 804, and number of iterations it may run in column 804. Column 806 allows a quality engineer to run just checked test cases. Column 808 shows the test module that actually implements the test logic for the corresponding test scenario.

Figure 9:
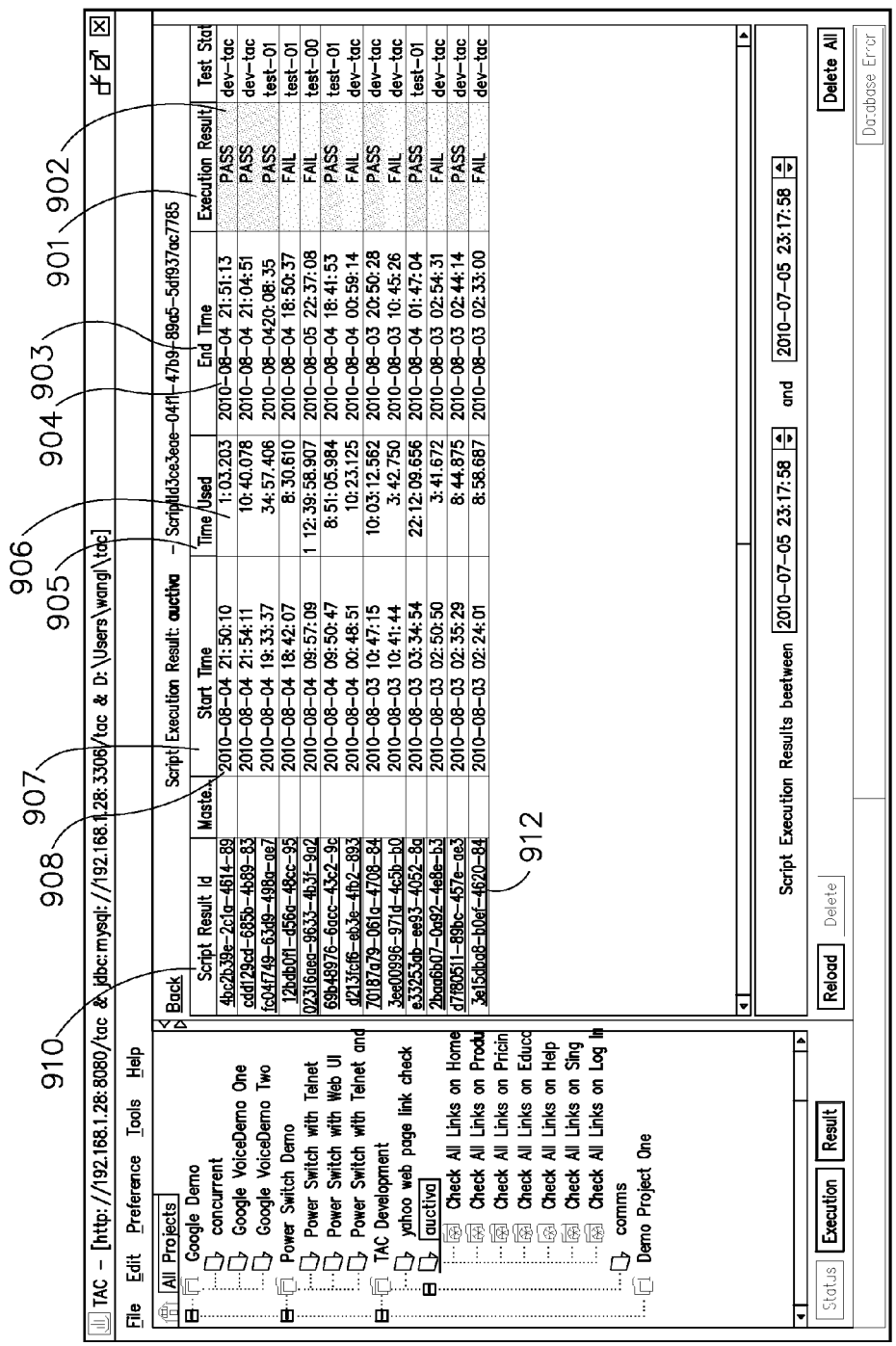
FIG. 9 is a view of IGUI 102A showing execution results for a sequence of test case scenarios.

FIG. 9 is a view of IGUI 102A showing execution results for the test script. In one embodiment, the script result Id 910 for script 912 shows a failed result in column execution results 901 or pass 902 status for a particular script. This IGUI shows the history of the test script result that is displayed and also stored for future quality assurance tasks, collaborative view and manager view. The start time 907, the date stamp 908 and end time 903 are shown for each test script execution result such as 906 and 904. It enables the user to determine an effective time test took 906 in the time used column 905 to run and the details of the results may enable the user to determine the effectiveness of the test logic and the test script used by the quality assurance engineer.

Figure 10:
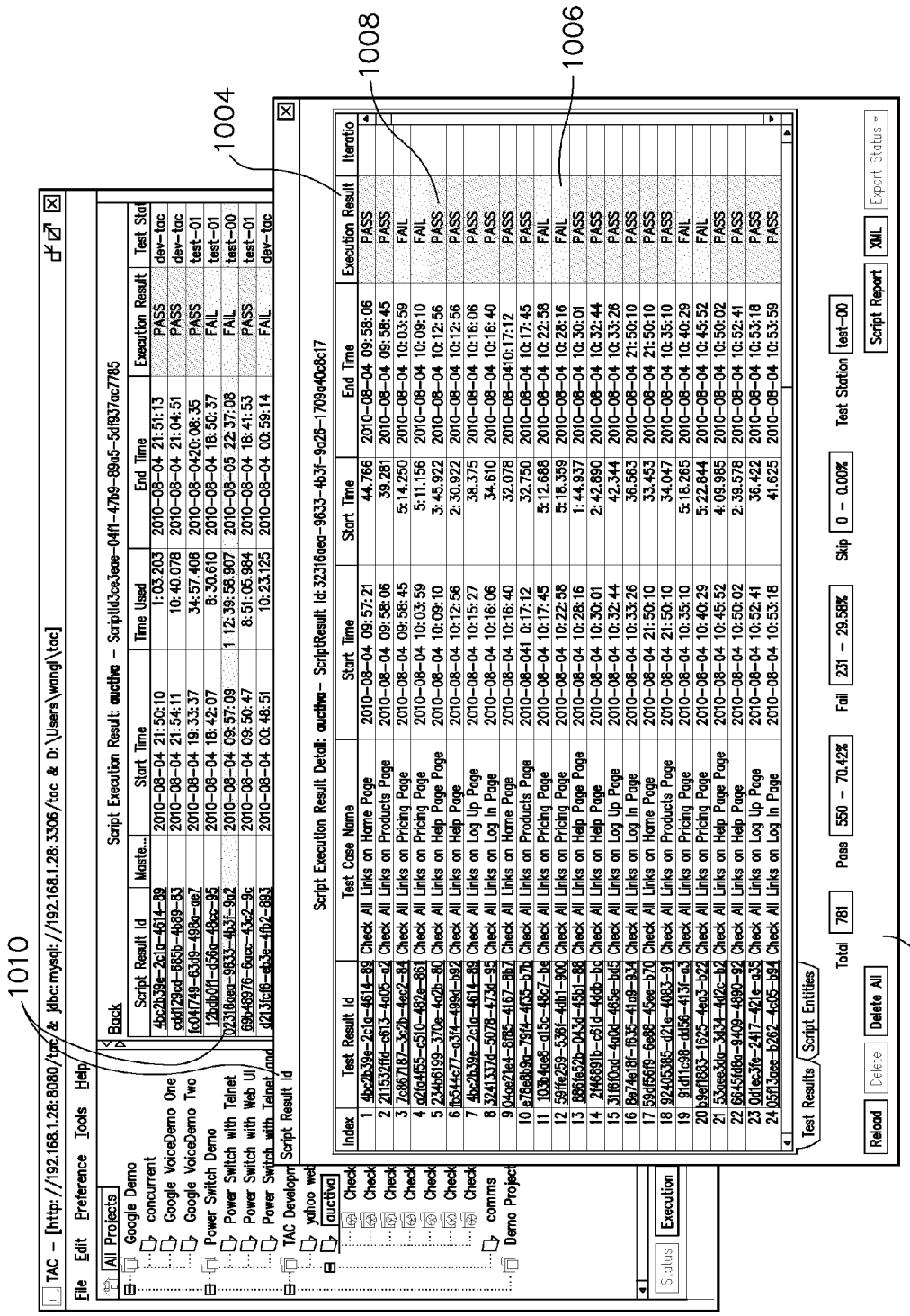
FIG. 10 is a view of IGUI 102A showing detailed reports for a sequence of test case scenarios.

FIG. 10 is a view of IGUI 102A showing detailed reports for the test script. In another embodiment, a much more detailed view of FIG. 9 is shown as another IGUI in FIG. 10. A particular script may be expanded as 1010. Report details 1002 is shown for that particular script result. The expanded result IGUI shows which specific test case shows a pass 1008 result and which one shows a fail 1006 result in the execution result 1004 column. Ease of readability and use enables the user and upper management to provide a better quality modular quality assurance test using this universal quality assurance automation framework 100.

In addition, it will be appreciated that the various systems and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
creating an universal quality assurance automation framework for software to design a quality assurance test using a computer readable medium;
designing a test logic in a test module for a given test scenario to perform the quality assurance test;
presenting an entity driver to the test module to encapsulate functionality of an entity in a given test environment ; and
connecting the entity driver containing the entity functionality to the given entity in the test environment using an entity communication.

2. The method of claim 1, further comprising:
automatically performing the quality assurance test using the test logic in the test module for a given test scenario;
creating a quality assurance test result and storing it in a database;
querying the database for a parameter to generate an expected result;
comparing the quality assurance test result to the expected result and validating the outcome and presenting a quality assurance test report for the given test scenario to an user; and
storing the quality assurance test report in the database for future retrieval.

3. The method of claim 2, wherein a computer readable medium is at least one of a server and a client computer.

4. The method of claim 1, further comprising:
performing the quality assurance test as at least one of as a single test and multiple tests simultaneously using the test logic;
storing a test resource parameter for checking, reusing and editing for future use; and
retrieving a quality assurance test parameter to perform a quality assurance test.

5. The method of claim 4, further comprising:
creating an uniform login environment for a testing framework for the user;
providing a test case authoring tool to the user in an unified integrated graphical user interface;
providing a hierarchical test case management tool to the user in the unified integrated graphical user interface for managing the quality assurance test; and
logging an activity of the user in a quality assurance test framework for future retrieval.

6. The method of claim 5, further comprising:
enabling a new user to learn the quality assurance test by review of stored quality assurance tests.

7. The method of claim 1, further comprising:
defining a test resource using the unified integrated graphical user interface; and
generating a template source code using the unified integrated graphical user interface to facilitate the test resource development.

8. A system, comprising:
a testing framework for a quality assurance automation process for software having a test resource in a computer readable medium;
a database comprising of a data storage and a retrieval of an user generated parameter and the test resource generated activity; and
an unified integrated graphical user interface configured to provide access to the test resource and an user created test resource parameter.

9. The system of claim 8, wherein the test resource is at least one of a test module, an entity driver, and an entity communication.

10. The system of claim 9, wherein the test module is at least one of a test case scenario, a list of entity drivers, a set of configurable test parameters, a list of test status.

11. The system of claim 8, further comprising:
an entity driver connected to the entity software using the entity communication resource; and
an activity log generated to be viewed by the user.

12. The system of claim 8, wherein the test resource generated activity pertaining to the test logic for receiving, presenting, querying, retrieving and storing is performed with respect to a plurality of test scenarios using the database.

13. The system of claim 8, further comprising:
a collaborative test automation in a unified integrated graphical user interface configured to provide access to a reusable testing resources of the test automation framework.

14. The system of claim 8, further comprising:
the test resource may be written using a software language that is product and operating system agnostic.

15. A method, comprising:
- creating an automated framework for quality assurance for software testing using a test resource utilizing a computer readable medium;
- designing a test logic in a test module for a given test scenario to perform the quality assurance software testing;
- presenting the entity driver to the test module to encapsulate functionality of the given entity in test environment; and
- connecting the entity driver containing the functionality of the given entity in the test environment using an entity communication.

16. The method of claim 15, wherein the automated framework is product and operating system agnostic.

17. The method of claim 15, wherein the test resource is at least one of a test module, an entity driver, and an entity communication.

18. The method of claim 15, wherein a computer readable medium is at least one of a server and a client computer.

19. The method of claim 15, further comprising:
- defining a test resource using the unified integrated graphical user interface;
- generating a template source code using the unified integrated graphical user interface to facilitate the test resource development;
- performing the quality assurance test as at least one of as a single test and multiple tests simultaneously using the test logic;
- storing the test resource parameters for checking, reusing and editing for future use.

20. The method of claim 15, wherein the test resource generated activity pertaining to the test logic for receiving, presenting, querying, retrieving and storing is performed with respect to a plurality of test environment using the database.

* * * * *